(12) United States Patent
Haronian et al.

(10) Patent No.: US 11,581,828 B2
(45) Date of Patent: Feb. 14, 2023

(54) ELECTROMAGNETIC VIBRATION AND ENERGY HARVESTER HAVING VIBRATING BODY, MAGNETS AND STATIONARY MAGNET AND HINGE

(71) Applicant: Enervibe Ltd, Hevel Eilot Regional Council (IL)

(72) Inventors: Dan Haronian, Efrat (IL); Michael Haronian, Efrat (IL)

( * ) Notice: Subject to any disclaimer, the term of this patent is extended or adjusted under 35 U.S.C. 154(b) by 0 days.

(21) Appl. No.: 17/366,045

(22) Filed: Jul. 2, 2021

(65) Prior Publication Data

US 2022/0360198 A1    Nov. 10, 2022

Related U.S. Application Data

(63) Continuation-in-part of application No. 17/308,252, filed on May 5, 2021.

(51) Int. Cl.
*H02K 35/02* (2006.01)
*H02N 2/18* (2006.01)

(52) U.S. Cl.
CPC ............. *H02N 2/188* (2013.01); *H02K 35/02* (2013.01)

(58) Field of Classification Search
CPC ........ H02K 33/00; H02K 35/02; H02K 35/00; H02K 35/04; H02K 3/26; H02K 15/02; H02N 2/188
USPC ................................. 310/12.12, 12.15, 12.01
See application file for complete search history.

(56) References Cited

U.S. PATENT DOCUMENTS

| | | | | |
|---|---|---|---|---|
| 4,630,943 A * | 12/1986 | Stahl | ........................ | F16J 15/43 384/446 |
| 5,110,141 A * | 5/1992 | Dayan | ................. | F16C 33/1035 310/90.5 |
| 5,180,939 A * | 1/1993 | Rosswurm | ............ | F02G 1/0435 290/1 R |
| 5,956,204 A * | 9/1999 | Dunfield | .............. | G11B 25/043 210/695 |
| 6,163,091 A * | 12/2000 | Wasson | ................... | H02K 41/03 310/12.22 |
| 6,686,824 B1 * | 2/2004 | Yamamoto | ............. | H05K 1/165 29/601 |
| 6,717,308 B2 * | 4/2004 | Chen | ...................... | F16C 33/107 310/90 |
| 6,809,427 B2 * | 10/2004 | Cheung | .................. | H02K 35/02 290/1 R |

(Continued)

FOREIGN PATENT DOCUMENTS

| | | | | |
|---|---|---|---|---|
| EP | 1705785 A1 * | 9/2006 | ............. | H02K 33/16 |
| GB | 2429337 A * | 2/2007 | ............. | H02K 35/02 |

(Continued)

*Primary Examiner* — Maged M Almawri

(57) ABSTRACT

An electromagnetic energy harvester for converting vibrations of a body to electricity that includes a coil with two ends that is wound along a longitudinal axis of a ferromagnetic core, a magnet, and a suspending device that its first end is designed to be fixed to the body and its second end is designed to be fixed to the magnet. The first end of the core is design to be at close proximity to the magnet and the longitudinal axis of the core is designed to be substantially aligned vertically to the magnetic axis of the magnet. The vibrations of the body can cause a relative alternating movement between the core and the magnet that can create alternating voltage between the ends of the coil.

2 Claims, 17 Drawing Sheets

(56) References Cited

U.S. PATENT DOCUMENTS

| | | | | |
|---|---|---|---|---|
| 6,812,598 | B2* | 11/2004 | Cheung | H02K 35/02 322/3 |
| 6,861,772 | B2* | 3/2005 | Cheung | H02K 35/02 290/1 R |
| 7,569,952 | B1* | 8/2009 | Bono | H02K 35/02 310/15 |
| 7,808,236 | B1* | 10/2010 | Huang | G01R 33/18 324/249 |
| 8,080,906 | B2* | 12/2011 | Roberts | H02K 35/06 310/20 |
| 8,193,781 | B2* | 6/2012 | Lin | H02K 35/02 336/200 |
| 8,432,049 | B2* | 4/2013 | Jung | F03D 5/00 336/200 |
| 8,552,607 | B2* | 10/2013 | Chan | F16C 32/0406 310/90 |
| 8,629,569 | B2* | 1/2014 | Roberts | H02K 35/06 290/1 R |
| 8,861,776 | B2* | 10/2014 | Lastrucci | H02K 33/16 381/396 |
| 9,041,230 | B2* | 5/2015 | Arnold | H02K 35/04 290/1 R |
| 9,121,875 | B2* | 9/2015 | Fukada | G01R 29/12 |
| 9,130,445 | B1* | 9/2015 | Katz | H02K 41/0356 |
| 9,231,461 | B2* | 1/2016 | Kim | H02K 35/04 |
| 9,576,713 | B2* | 2/2017 | Goodman | H01F 7/1638 |
| 9,692,287 | B2* | 6/2017 | Yamamoto | H02K 35/02 |
| 9,850,733 | B2* | 12/2017 | Fripp | E21B 33/12 |
| 9,942,663 | B1* | 4/2018 | Salvatti | H04R 9/025 |
| 2003/0062660 | A1* | 4/2003 | Beard | H02K 15/02 264/645 |
| 2004/0251750 | A1* | 12/2004 | Cheung | H02K 35/02 310/23 |
| 2005/0151375 | A1* | 7/2005 | Cheung | B60C 23/041 290/1 R |
| 2005/0247357 | A1* | 11/2005 | Welle | B01L 3/502738 137/828 |
| 2007/0052302 | A1* | 3/2007 | Cheung | B82Y 25/00 310/12.25 |
| 2008/0278008 | A1* | 11/2008 | Roberts | H02K 35/06 310/29 |
| 2011/0057629 | A1* | 3/2011 | Lin | H02K 35/02 322/3 |
| 2011/0140458 | A1* | 6/2011 | Arnold | H02K 35/04 290/1 R |
| 2011/0140577 | A1* | 6/2011 | Galchev | H01L 41/00 310/22 |
| 2011/0169347 | A1* | 7/2011 | Miyamoto | G06F 3/016 310/12.21 |
| 2012/0086213 | A1* | 4/2012 | Chan | H02K 7/088 310/90 |
| 2012/0211990 | A1* | 8/2012 | Davey | F03B 15/00 290/54 |
| 2013/0010999 | A1* | 1/2013 | Lastrucci | H02K 33/16 381/400 |
| 2015/0302987 | A1* | 10/2015 | Sano | H01F 41/04 29/602.1 |
| 2017/0084376 | A1* | 3/2017 | Kubota | H01F 17/0006 |
| 2018/0266849 | A1* | 9/2018 | Chen | G08B 6/00 |
| 2018/0358878 | A1* | 12/2018 | Liu | H02K 1/34 |

FOREIGN PATENT DOCUMENTS

| | | | | |
|---|---|---|---|---|
| SU | | 1075089 A | * | 2/1984 |
| WO | WO-2009068856 A2 | * | 6/2009 | H02K 1/34 |

* cited by examiner

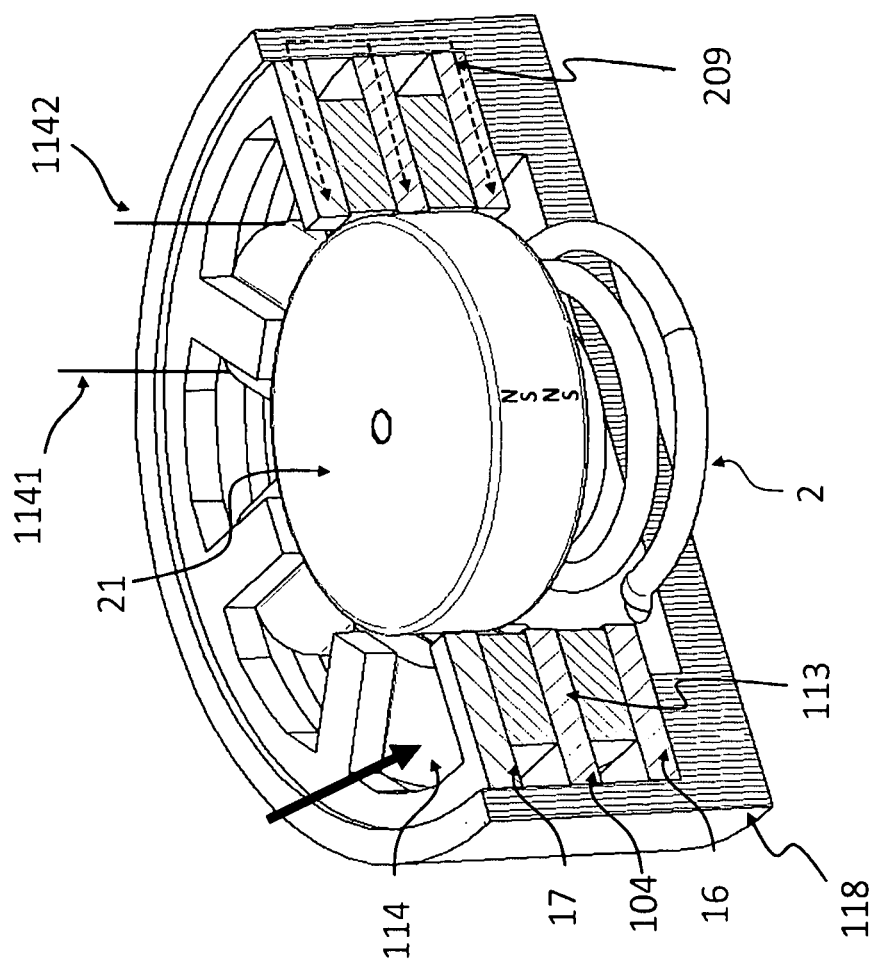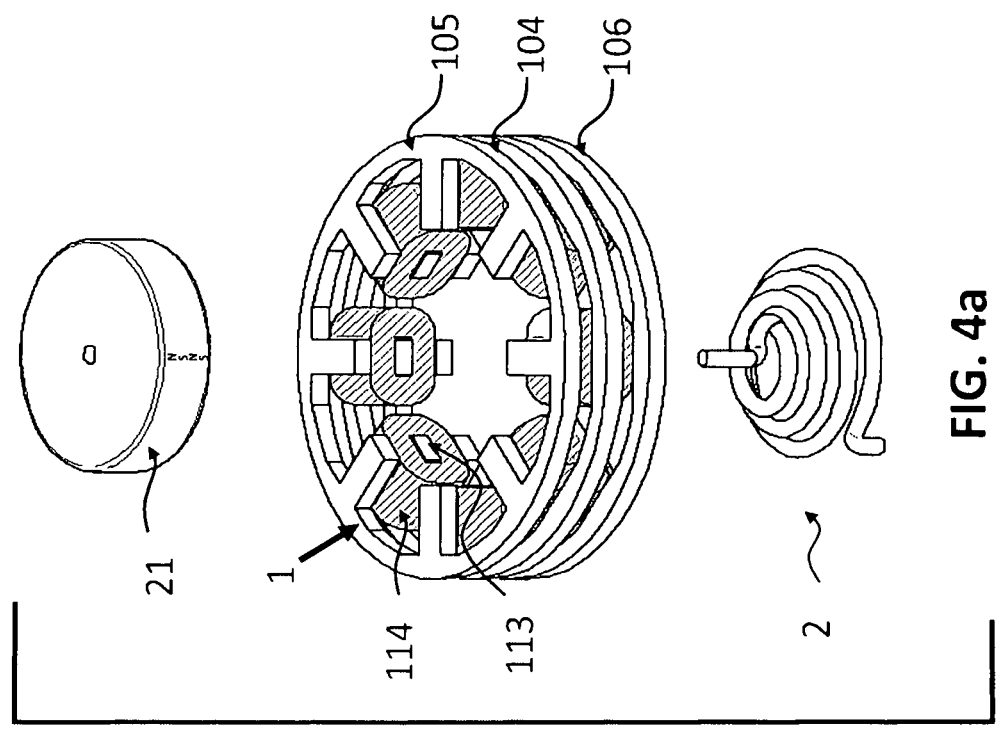
FIG. 4a
FIG. 4b

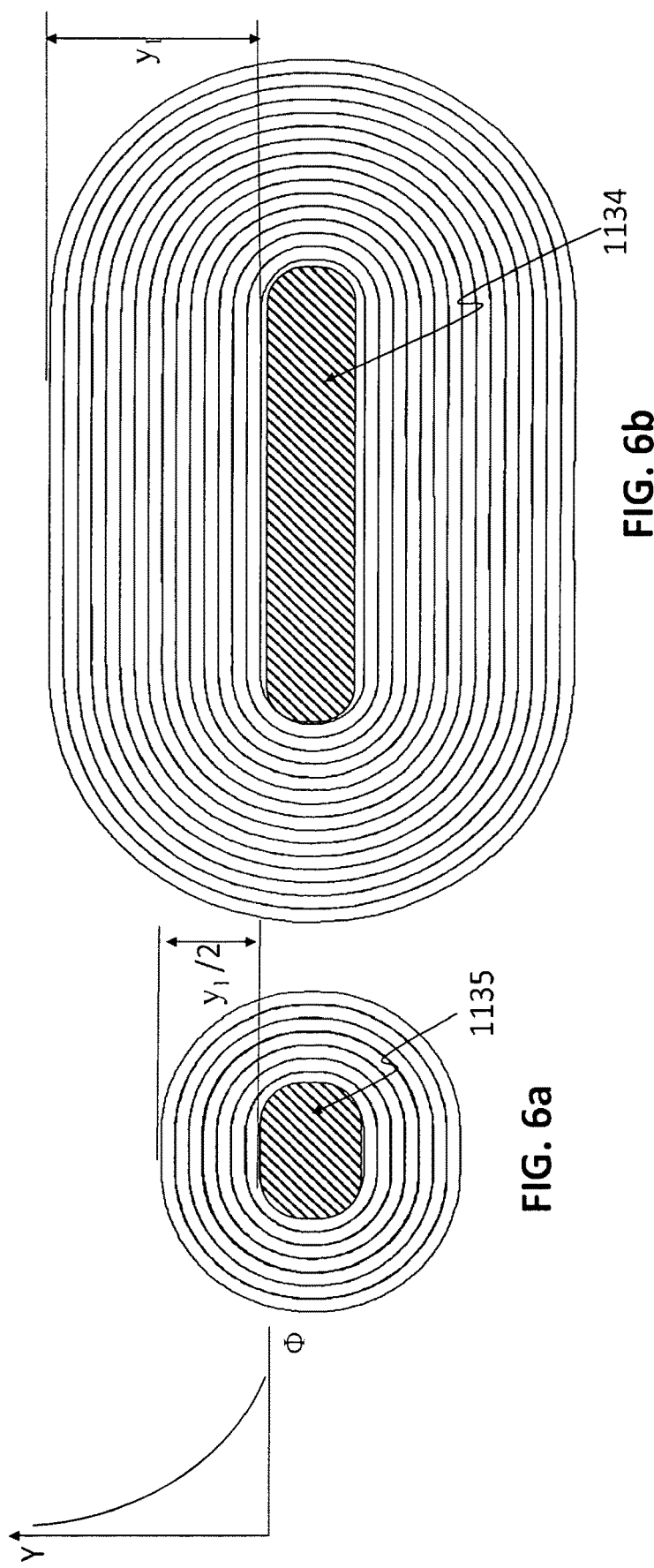

ELECTROMAGNETIC VIBRATION AND ENERGY HARVESTER HAVING VIBRATING BODY, MAGNETS AND STATIONARY MAGNET AND HINGE

RELATED APPLICATIONS

This application is a continuation in part of U.S. patent application Ser. No. 17/308,252 filed on May 5, 2021.

TECHNICAL FIELD

The present invention refers to an electromagnetic energy harvesting that converts vibrations of a body into electricity. The harvester comprises a magnet suspended by a suspending device that is free to vibrate or rotate close to a coil winded ferromagnetic core.

BACKGROUND OF THE INVENTION AND PRIOR ART

This patent application is related to an electromagnetic energy harvesting that converts vibrations of a body into electricity. Vibrations may be caused by vibration of machines or may be caused by impulses generated for example by movement of human limb, inside a rotating tire, or by sport devices such as balls and rackets.

Applications may use vibration energy harvester to power devices such as sensors that are attached to a body that is subject to vibrations or impulses. Electromagnetic Vibration Energy Harvesters typically comprise a magnet moving near a coil. According to Lentz and Faraday's laws, such movement induces electromotive force between the coil wires that may be harvested to power devices.

This patent application uses a different configuration that is mostly suitable for small vibration. The configuration uses magnet moving relative to a core winded by coil such that small vibrations revere the magnetic flux in the core. Patent U.S. Pat. No. 8,704,625B2 shown schematically in FIG. 1a, is an Electromagnetic energy transducer based on Faraday's law. Faraday's law states that relative movement between magnet and a conductor changes the magnetic flux is which creates an electromotive force inside the conductor: $F=-Nd\Phi/dt$, where F is the electromotive force, N is the number of the conductor turns, $\Phi$ is the magnetic flux. It is shown that the electromotive force is proportional to the speed of flux change. In the prior art U.S. Pat. No. 8,704,625B2 shown in FIG. 1a magnetic circuit is formed using permanent magnets (30) (31) with north and south poles and ferromagnetic core (32) with 1st (321) and 2nd (322) sides. A coil (33) is wrapped around the core. In a first position the north pole of magnet (30) is connected to the 1st side (321) and the south pole of magnet (31) is connected to the 2nd side (322). By moving the core such that the north pole is connected to the 2nd side and the south pole is connected to the 1st side, the flux in the magnetic circuit is reversed thus $d\Phi/dt$ is high which generates an impulse of current inside the coil that may be used to power a wireless switch.

Prior art U.S. Pat. No. 9,509,304B2 and US 240267B2 use the same concept of reversing the magnetic flux across the inductor but using different mechanism.

In prior art WO2019002775 A1, shown schematically in FIG. 1B, relates to an electromagnetic energy converter (11) comprising: a conducting coil (20); a main magnet (30) in an inner space formed by the conducting coil (20), retaining means (40) allowing the main magnet to rotate about an axis YY' between two stable equilibrium positions; a first actuator magnet (31) and a second actuator magnet (32) disposed facing the first end (21) and the second end (22) respectively, the first (31) and second (32) actuator magnets being arranged to slide simultaneously in the same direction and parallel to the main axis XX' once a force is exerted on either one of the first (31) or second (32) magnets. By executing a rotational movement, under the action of actuator magnets, a temporal variation of magnetic flux in the conductive coil (20), and thus generates a voltage impulse at terminals of said coil.

Prior art US 2008/0048506 A1, shown schematically in FIG. 1c, uses a magnet (4001) sliding over a coil (221) to generate, voltage drop between the coil terminals. The coil has a magnet at its extremes 24a, 24b. The sliding is accomplished through a sliding mechanism that includes a rocker (10) having a pivot. The rocker has two magnets at its extremal ends (10a), (10c) and lending magnets (10b), (10d) on the landing sites such that when the rocker is switched from one position to the other, the magnet on one of the extremal moves closer to its landing magnet while the magnet on the other extremal moves away from its landing magnet. Moving the rocker from one position to the other, slides magnet (401) along the coil using a paddle (42). The action of the rocker with its magnets and the magnets on the extremes of the coil (24a), (24b) creates magnetic forces on the driver magnet (401) causing it to induce voltage impulse in the wire coil that is higher than if no rocker and face magnets were present.

FIG. 1d describes state of the art an Electromagnetic Vibration Energy Harvesting showing a magnet (100) suspended by a spring (101) inside a coil (102). The coil is fixed to a body (103) such that when the body moves or vibrates the magnet vibrates relative to the coil and induces voltage between the two ends of the coil (1021).

BRIEF DESCRIPTION OF THE FIGURES

FIGS. 4a and 4b depict an embodiment of an electromagnetic energy harvester described in this patent application.

FIGS. 6a and 6b depict a comparison between the magnetic flux in Y direction of the electromagnetic energy harvester described in FIG. 2 and in FIG. 4.

THE INVENTION

The prior art of Electromagnetic Energy Harvesting describes devices that uses polarity reversal of a core to generate an electrical impulse in a coil that is used for switching application. In addition, the prior art describes a Vibration Energy Harvesting that uses the vibration of a magnet next to a coil to generate electricity in the coil.

Figure 2:
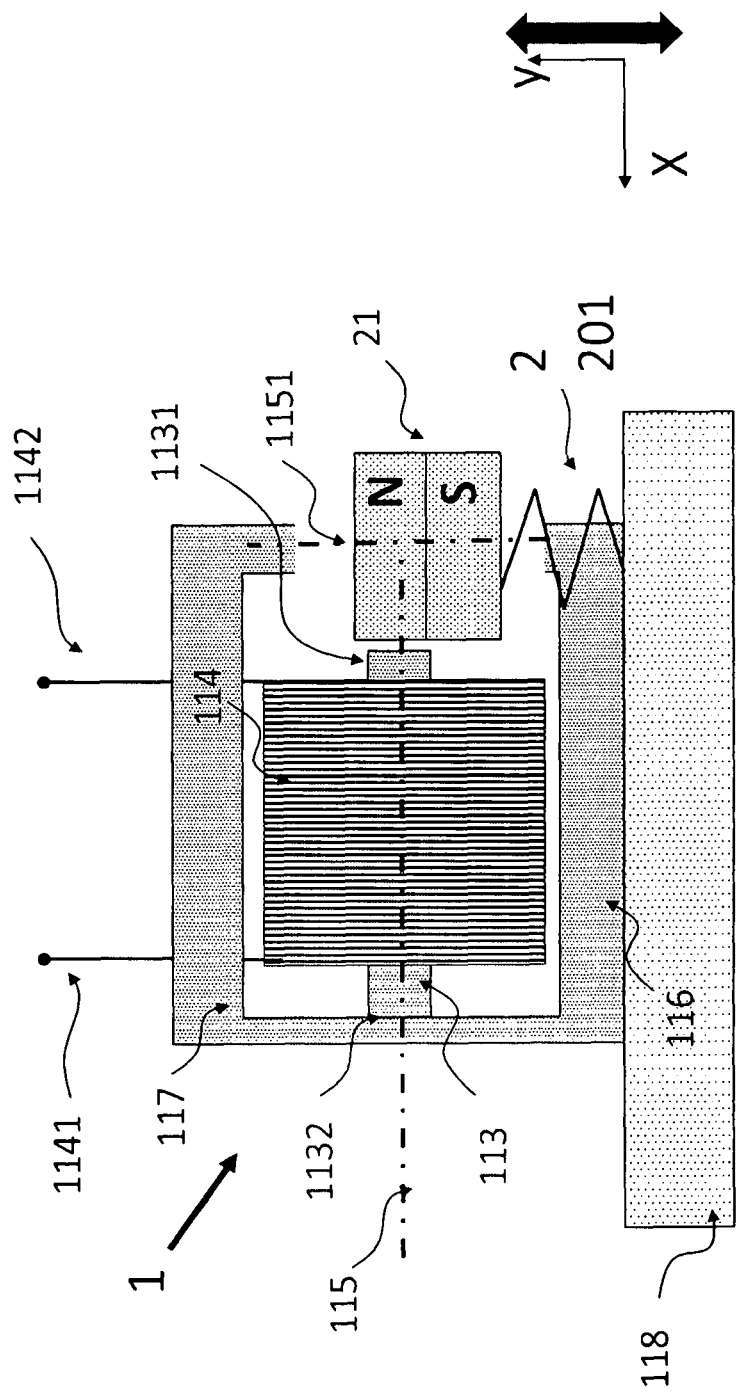
FIG. 2 is one embodiment of an electromagnetic energy harvester described in this patent application.

In this patent application a different Electromagnetic Vibration Energy Harvesting is described. The basic configuration is shown in FIG. 2. Here a magnet (21) suspended by a suspending device (2) such as a spring and is free to vibrate in the vertically (1151) to the length of the core (115). Device (1) is fixed to the body (118) and comprise a ferromagnetic core (113) winded by coil (114). The magnet is close to a first side (1131) of the coil such that when the body vibrates or shocked in the Y direction, a movement or an oscillating movement of the magnet relative to the first side of the core is induced such that an alternating voltage is generated between the two ends (1141) and (1142) of the coil. Device (1) may also include ferromagnetic magnetic flux confiners (116) and (117) that confines the magnetic flux close to the coil.

Figure 3B:
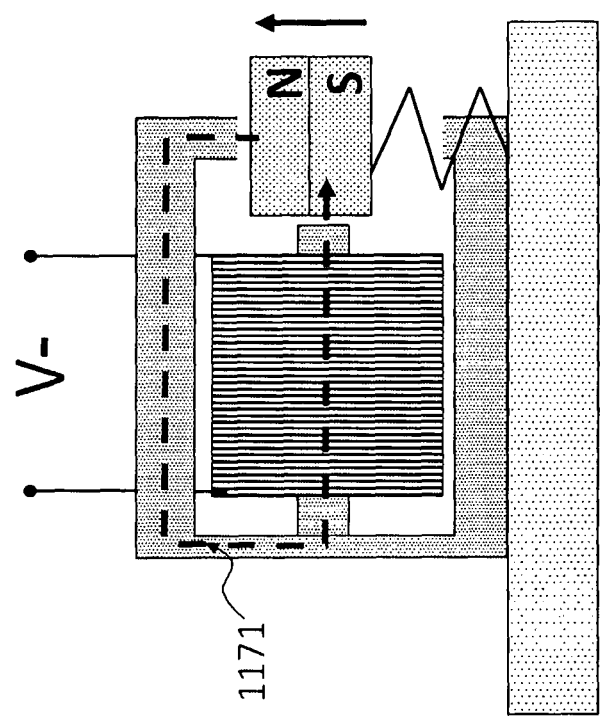
FIGS. 3a and 3b are a detailed description of the electromagnetic energy harvester.
Figure 3A:
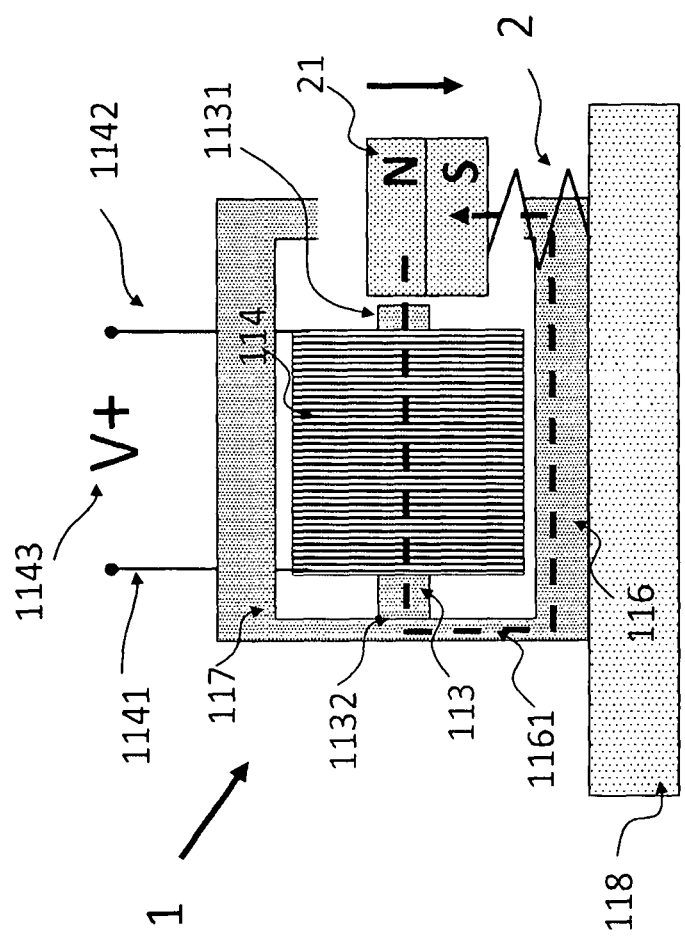

FIG. 3 describes the operation of the harvester in more details. In FIG. 3*a* the magnet (21) moves downwards and changes the magnetic polarity of the magnetic flux in the core such that the magnetic flux (1161) flows through the lower magnetic flux confiner (116). In FIG. 3*b*, the magnet moves upwards reversing the magnetic polarity of the magnetic flux in the core such that the magnetic flux (1171) flows through the upper magnetic flux confiner (117). These rapid polarity changes of the magnetic flux leads to high dΦ/dt and to an alternating voltage (1143) between the coil ends (1141, 1142).

Figure 1A:
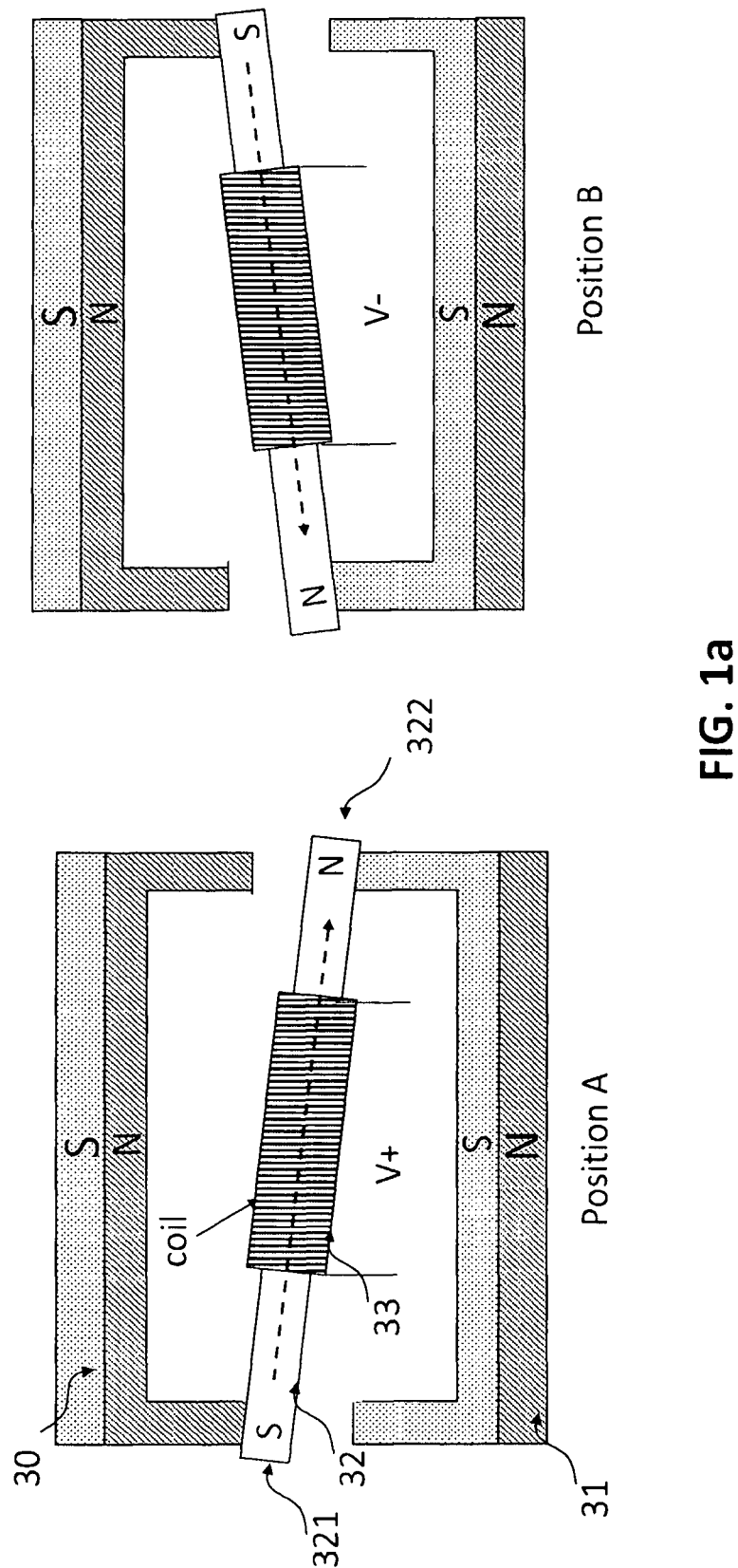
FIG. 1a is a prior art according to patent number U.S. Pat. No. 8,704,625B2.
Figure 1C:
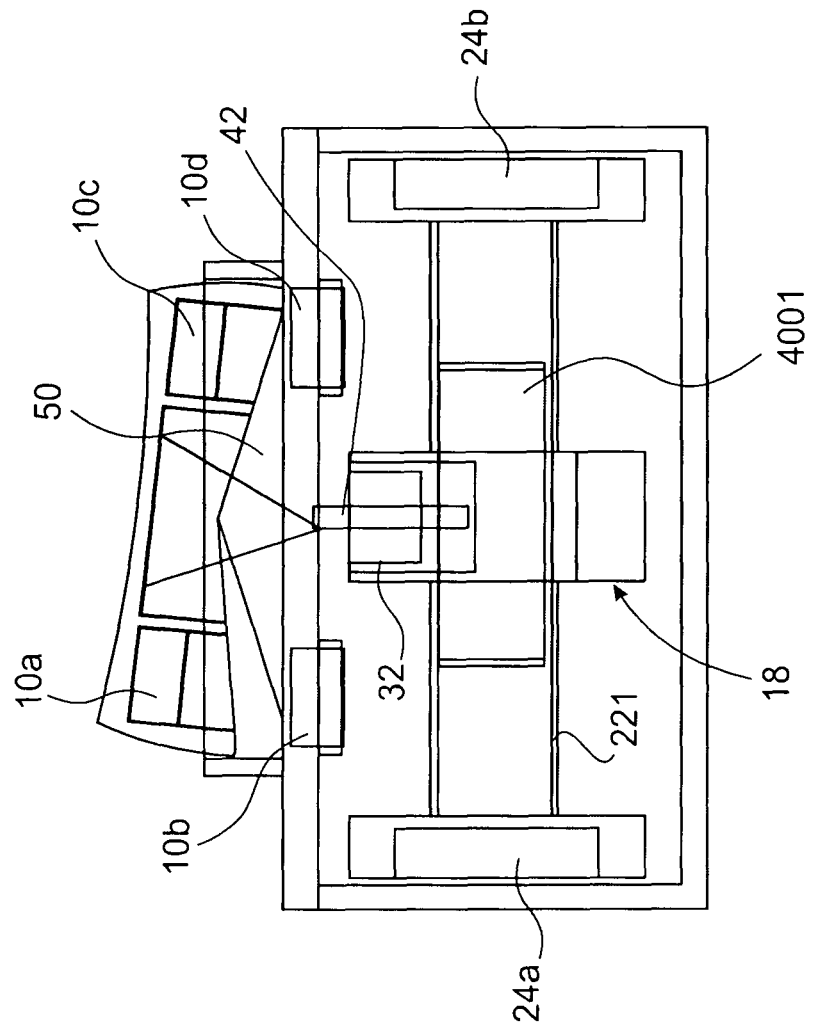
FIG. 1c is a prior art according to patent number US 2008/0048506 A1.
Figure 1B:
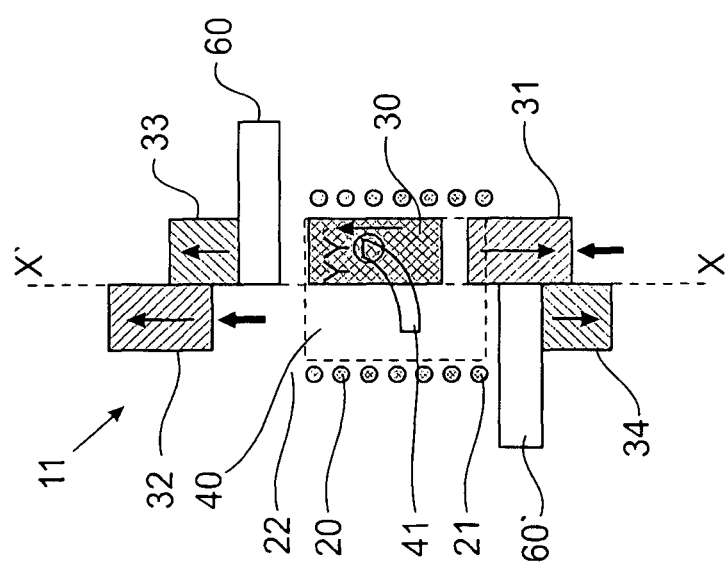
FIG. 1b is a prior art according to patent number WO2019002775 A1.
Figure 1D:
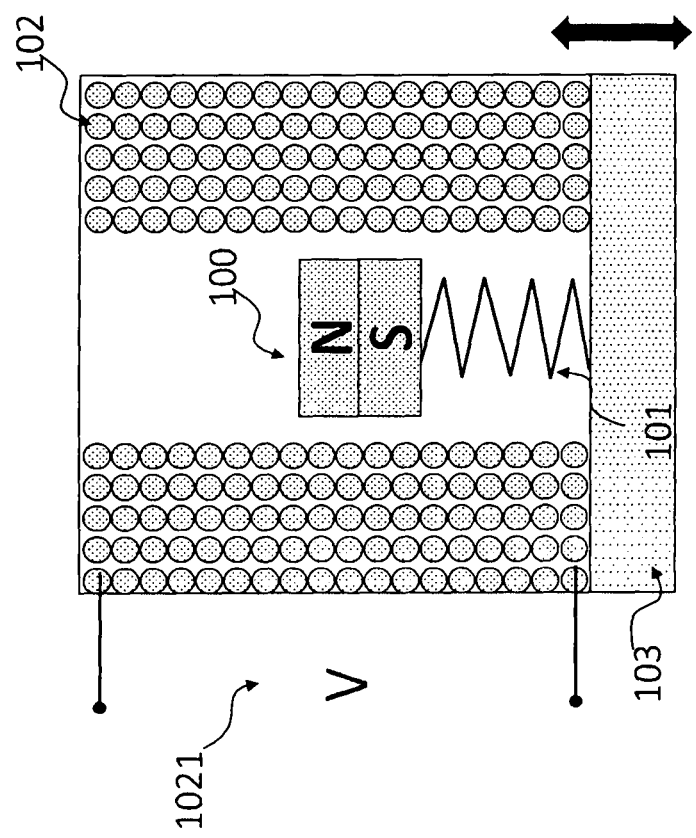
FIG. 1d is a State of the art Electromagnetic Vibration Energy Harvesting.

The method of magnet moving inside a coil in prior art descried in FIG. 1*a* is more practical when a large displacement is expected such that electrical power is generated in the coil as long as there is a movement. The magnet moving relative to a core described in FIG. 2 and FIG. 3 is more practical for small vibration amplitudes such that the polarity of the flux is reversed in each cycle of the vibration.

It is noted that in practice a stopper is added to the harvester in order to prevent large deflections of the magnet in order to prevent mechanical damages. Such stoppers are omitted from the drawings for the sake of simplicity.

The intensity of the magnetic flux drops as the wires of the coil are further away from the magnet or from the core. Therefore, wires close to a magnet or to a core will contribute more power than wires further away from the core or from the magnet. In addition, increasing the number of wires increases the resistivity of the wires and therefore to power loss due to the wire resistivity.

Another embodiment of this patent application is a high density electromagnetic energy harvester described in FIG. 4. In this embodiment a magnet (21) is suspended by a suspending device such as a spring (2) that is free to vibrate close to several device (1) arranged around the magnet. Each of device (1) comprise a core (113) winded by a coil (114), fixed to the body (118). The multi-core harvester described in FIG. 4, shows 8 devices. The multi-core harvester may be made by a single ferromagnetic disc (104) with cores protruding inside as described in FIG. 4. In addition, the multi-core harvester described in FIG. 4 shows an upper (105) and a lower (106) ferromagnetic bars for confining the magnetic flux of the magnet close to the coils. As in FIG. 2, the North-South poles of the magnet are aligned in the direction of the vibration. It is also noted that the magnet may have more than one North-South poles one on top of the other as described in FIG. 4.

Figure 5A:
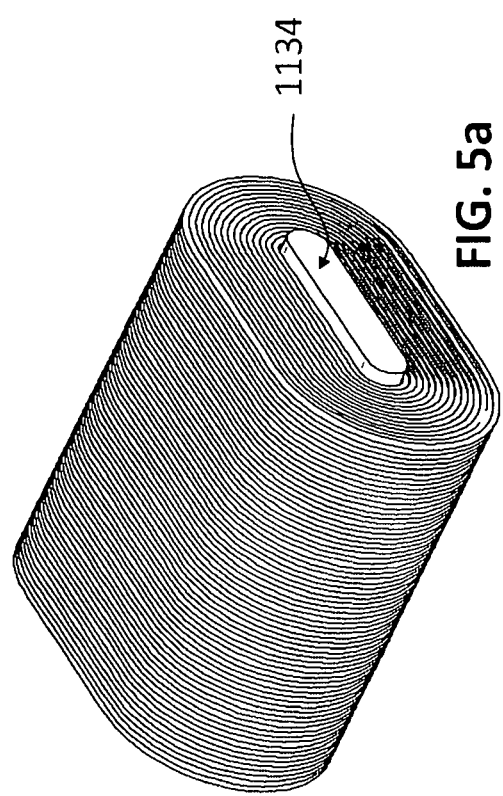
FIGS. 5a and 5b depict a comparison between the coils of the electromagnetic energy harvester described in FIG. 2 and in FIG. 4.
Figure 5B:
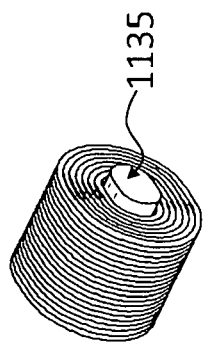

In order to exemplify the advantage of the design described in FIG. 4 over the design described in FIG. 2, a comparison between a single core and multi-core harvester is introduced. FIG. 5*a* describes a core (1134) of single core harvester with 956 winds of wire with diameter of 0.2 mm. The measured resistivity of the wire is 16.5Ω. FIG. 5*b* describes one core (1135) of the 8 cores harvester, winded by wire with diameter of 0.2 mm such that the overall winds of the 8 cores is the same as that of the single core. When connected in series the overall resistance of the 8 coils is 8.82Ω. Therefore, the embodiment described in FIG. 4 offers a 50% reduction in the resistivity power loss of the coil compared to the embodiment described in FIG. 2.

FIG. 6 describes a cross section of the two coils described in FIG. 5. Since the magnetic flux Φ, drop with the distance (Y) from the core, moving from single coil with total wire thickness $y_1$ to 8 coils each with thickness $y_1/2$ with the same overall number of turns, increases the average magnetic flux on the wires by 56% compared to the embodiment described in FIG. 2.

Figure 7A:
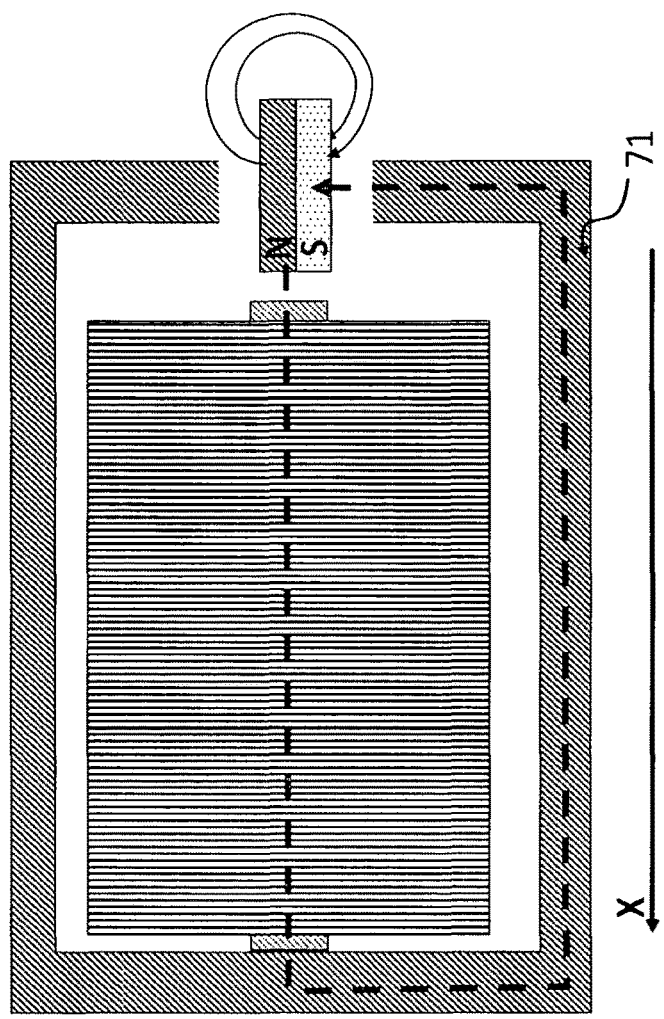
FIGS. 7a and 7b depict a comparison between the magnetic flux in X direction of the electromagnetic energy harvester described in FIG. 2 and in FIG. 4.
Figure 7B:
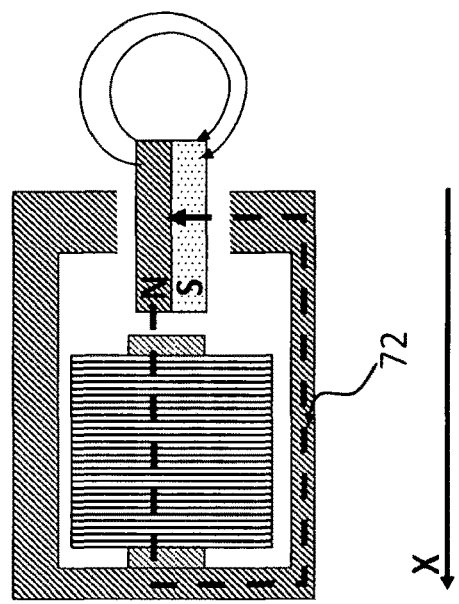

FIG. 7*a* shows the magnetic circuit (71) of the single core harvester described in FIG. 5*a*, and FIG. 7*b* shows the magnetic circuit (72) of one of the cores of the 8 cores harvester described in FIG. 5*b*. It is evident that the magnetic circuit for the single core harvester is much longer than that of the cores of the 8 cores harvester. Longer magnetic path translates to higher losses of the magnetic flux. In addition, the magnetic flux along the core is not the same due to losses inside the core and therefore the magnetic flux in wires farther away along the X axis is smaller than that of wires closer to the magnet.

It is noted that the embodiment described in FIG. 4 the coils of the different devices may be connected in series or in parallel or any other combination. It is also noted that embodiment described in FIG. 4 is an example and therefore any magnet shape and coil winded core arrangement may be used.

Table 1 summarizes the advantages of the embodiment described in FIG. 4, over the embodiment described in FIG. 2.

TABLE 1

|  | Single core | multi-core |
|---|---|---|
| loss due to wire resistance | High | Low |
| Average magnetic flux in Y direction | Low | High |
| Average magnetic flux in X direction | Low | High |

Figure 8:
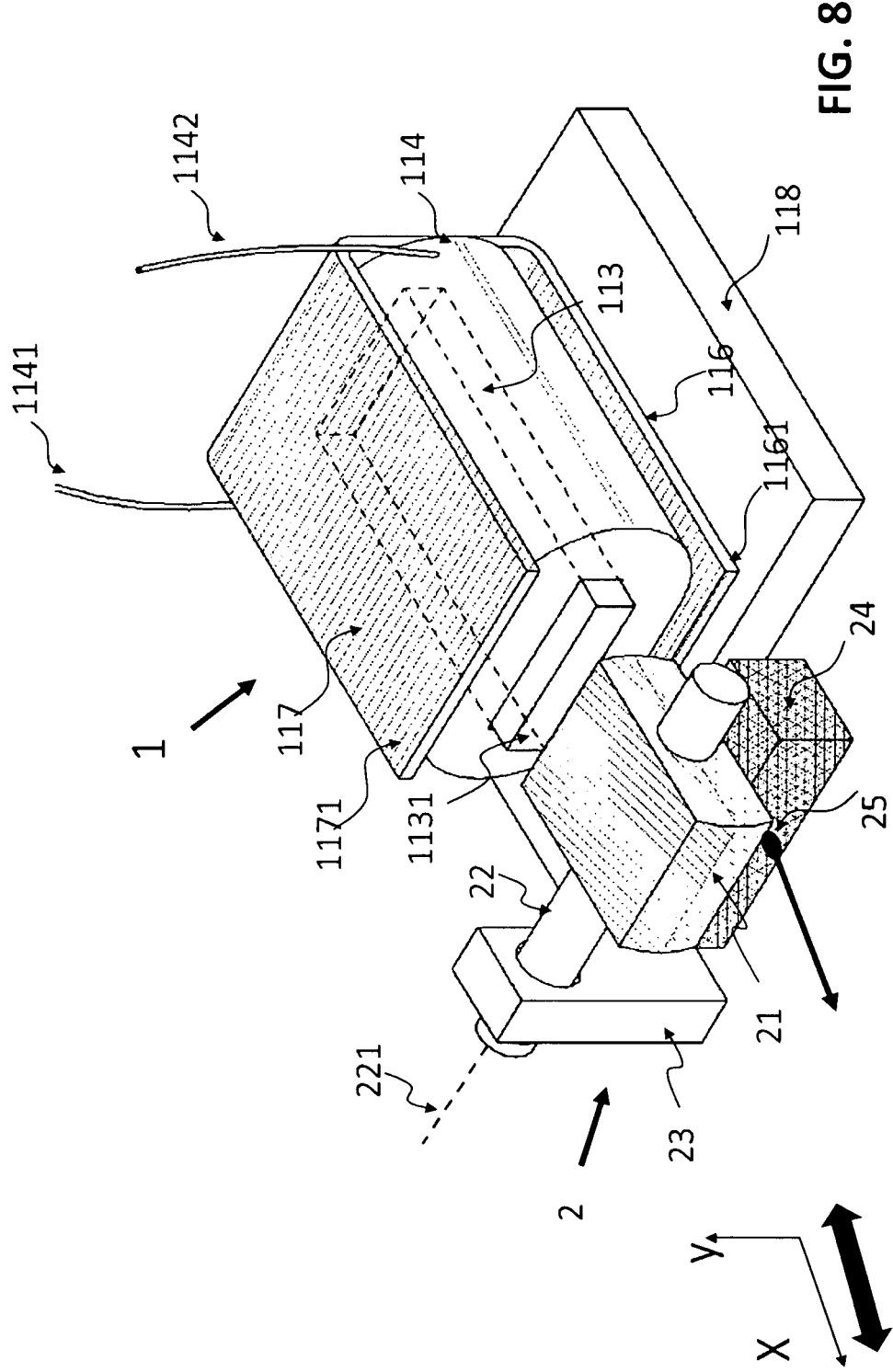
FIG. 8 is an embodiment of a spring-less electromagnetic energy harvester.

FIG. 8 describes and embodiment of a spring-less vibration energy harvester. As in previous embodiments the harvester comprise a device (1) fixed to a support (118). Device (2) comprise a hinge (22), supported by support (23) that is fixed to the body (118), is free to rotate around its axis (221). The magnet (21) and a seismic mass (24) are fixed to the hinge such that the weight of the hinge, loaded by the seismic mass and the magnet, shifts the center of gravely (25) off from the hinge rotation axis (221). The magnet is positioned close to one side of the core (1131) and to the ends of the bottom and upper magnetic flux confiner (1161, 1171) such that it is approximately aligned to the core. Upon vibration of the body in the X direction, or due to an impact force applied on the body in the X direction, and due to the location of the center of gravity (25) off the center of rotation, a relative alternating movement is induced between the core and the magnet that induce an oscillating intensity of magnetic flux along the core and along the magnetic flux confiners that induces an alternating voltage between the coil ends (1141, 1142). It is noted that the harvester is designed such that there is one stable state of the magnet, such that at rest the magnet is approximately aligned with the core.

Figure 9:
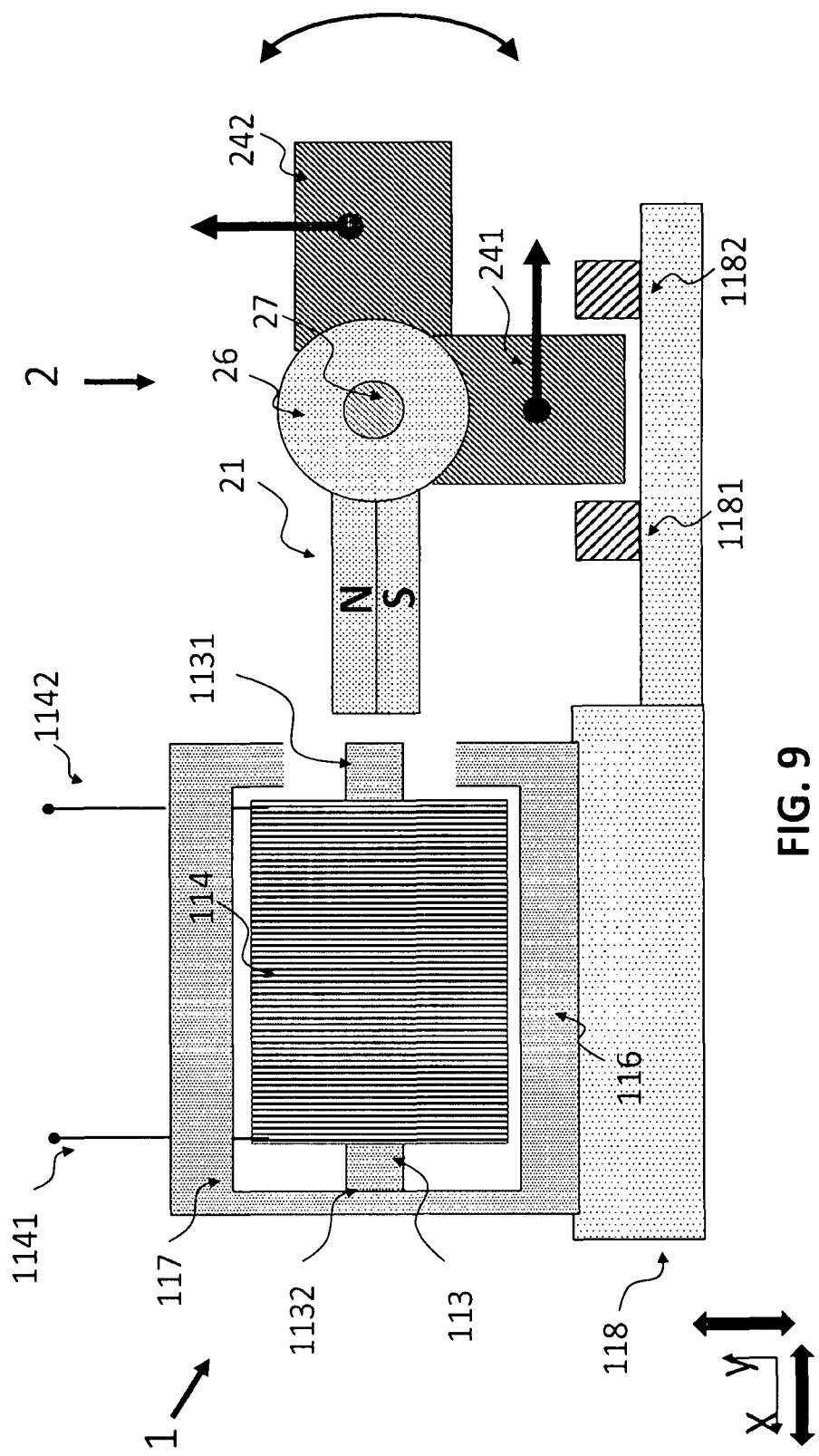
FIG. 9 is the embodiment of a spring-less electromagnetic energy harvester described in FIG. 8 with two seismic masses.

FIG. 9 describes another embodiment of the harvester described in FIG. 8.

Here two seismic masses (241, 242) are used such that the harvester is responsive to vibration and shocks in the X and Y directions. Also shown are stoppers (1181, 1182) for limiting the vibration amplitudes.

The advantage of such a harvester over a spring based harvester is that there is no need to protect the magnet from large impacts since at most, the magnet will go through rotation around the hinge.

Figure 10:
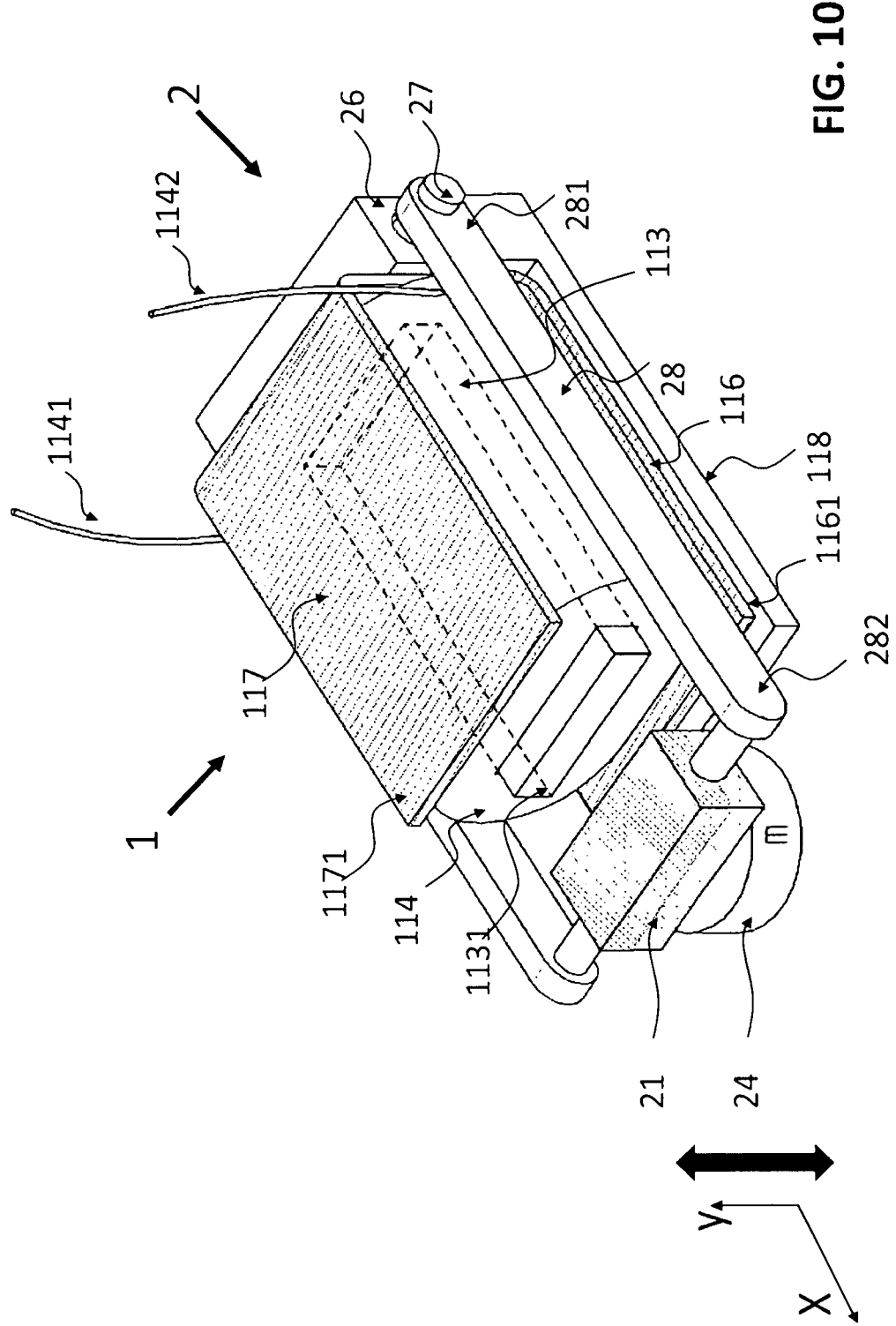
FIG. 10 is an embodiment of a spring-less electromagnetic energy harvester with long level for high force of moment generation.

FIG. 10 describes another embodiment of the harvester described in FIG. 8. Device (2) comprise a support (26) fixed to the body (118) and a free to rotate hinge (27). The free to rotate hinge is fixed to one end (281) of a lever (28) and the second end of the lever is fixed to the magnet (21) and to a seismic mass (24). The magnet is positioned close to the end of the core (1131) and to the ends of the bottom and upper magnetic confiner (1171, 1161) such that it is held approximately aligned to the core. Upon vibration or impact in the Y direction on the body, an oscillating relative displacement is induced between the end of the core (1131) and the magnet (21), that induces an alternating voltage between the coil ends (1141, 1142).

Figure 11:
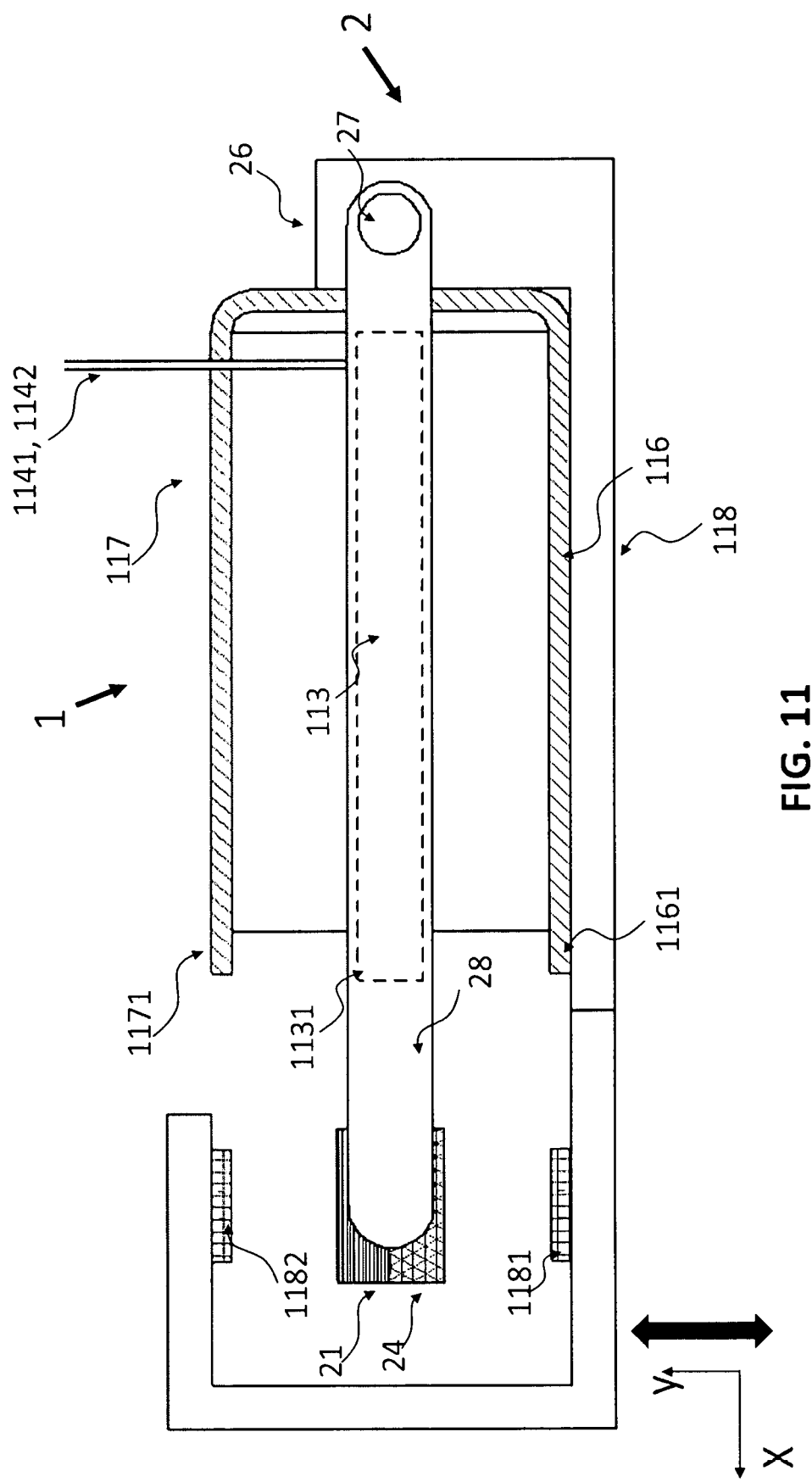
FIG. 11 is a side view of the vibration energy harvester described in FIG. 10.

FIG. 11 describes a side view of the harvester described in FIG. 10 with two stoppers (1181, 1182) for limiting the vibrations of the seismic mass and magnet.

Figure 12:
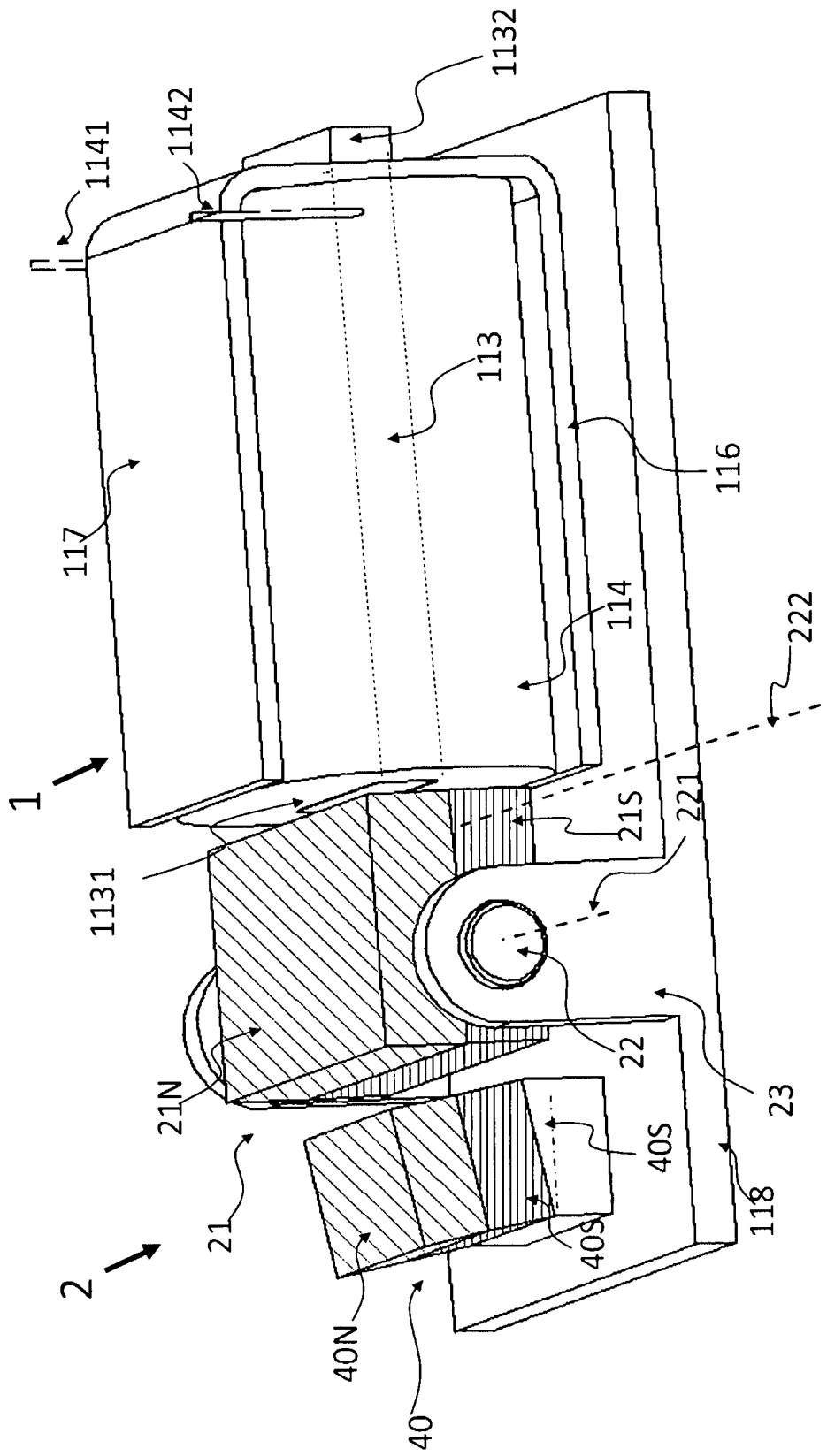
FIG. 12 is another embodiment of a spring-less electromagnetic energy harvester.

FIG. 12 describe another embodiment of the invention. In this embodiment Device (2) comprising a free to rotate hinge (22) that is supported by a base (23) that is connected to the vibrating body (118). Magnet (21) is fixed to the hinge and therefore may rotate around the axis of the hinge. The harvester further includes a stationary magnet (40) that is attached to the body or to the base at a pre-designed angle (41) and at close proximity to the magnet (21), that is free to rotate, such that the similar poles (40N) and (21N) as well as (40S) and (21S) are facing each other and also such that magnet (21) is facing the end of the core (1131) at a pre-designed position. The center of gravity (222) of the hinge together with the magnet is shifted off the rotation axis (221) of the hinge such that vibrations of the body or shocks applied on the body can cause the magnet to rotate. The stationary magnet serves as a restoring force to magnet (21) when forced off its rest position such that vibration or shocks applied on the body may cause alternating relative movement between the core (113) and the free to rotate magnet (21) that can create alternating voltage between the ends (1141, 1142) of the coil.

The pre-determin angle (41) as well as the position of magnet (21) relative to the end of the core (1131) depends on the shape and direction of the exciting force.

Figure 13:
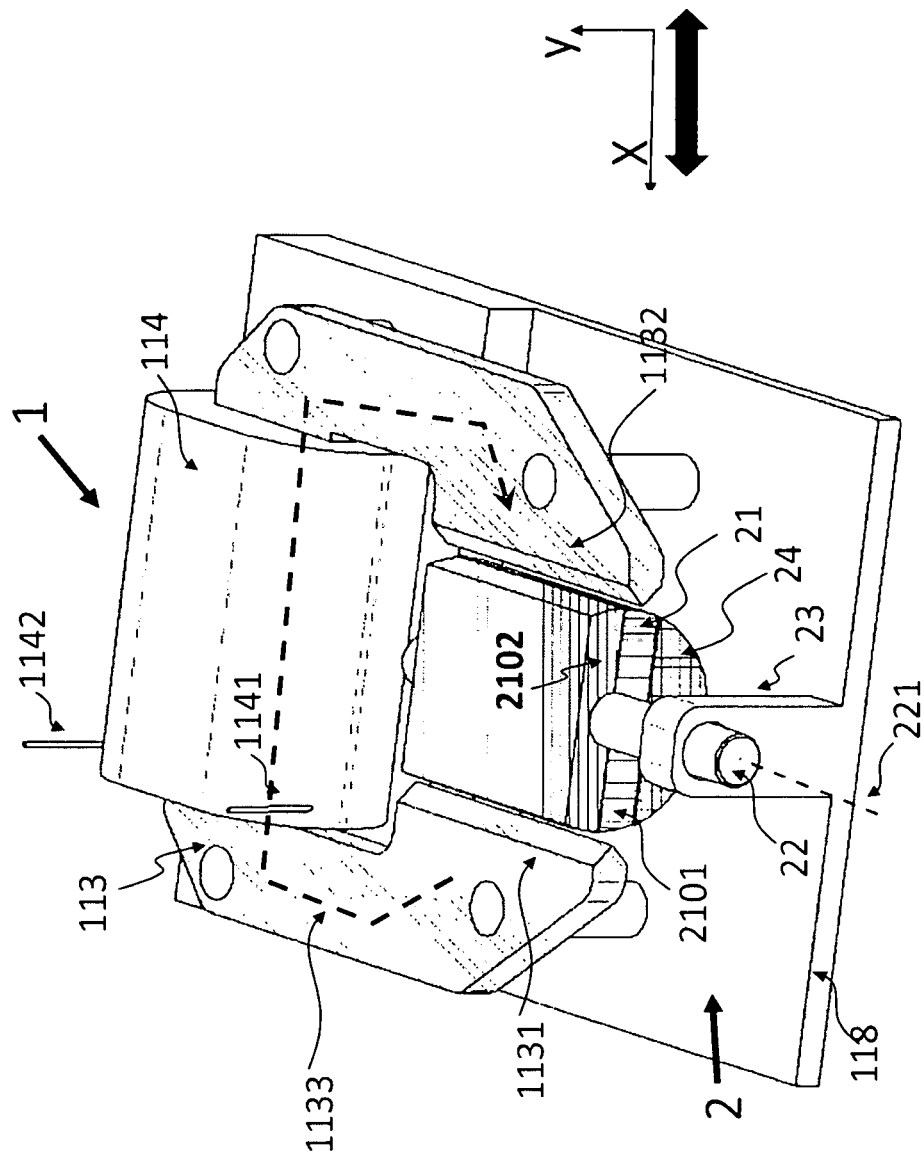
FIG. 13 is another embodiment of a spring-less electromagnetic energy harvester.

FIG. 13 describe another embodiment of this patent application. Device (1), fixed to the body (118), comprise a core (113) winded by conductive coil (114) with coil ends (1141) and (1142). The core ends (1131) and (1132) extends from both sides. Device (2) comprises a hinge (22), supported by support (23) that is fixed to the body (118), is free to rotate around its axis (221). The magnet (21) and a seismic mass (24) are fixed to the hinge such that the center of gravity of the hinge loaded by the magnet and the seismic mass is off of the rotation axis (221) of the hinge. The magnet is position at close proximity to the ends of the core (1131) and (1132) such that one of the magnet poles (2101) faces the end of one end of the core (1131) and the second pole of the magnet (2102) faces the second end of the core (1132). At rest, a magnetic flux with given polarity (1133) is induced along the core. A vibration of the body (118) along the X direction or an impulsive shock on the body in the X direction, induces a rotation of the hinge (22) around its rotation center (221) which oscillates between the magnet polarities that faces the ends (1131) and (1132) of the core. This magnet polarities oscillation alternates the direction of the magnetic flux along the core that induces an alternating voltage between the coil ends (1141), (1142).

It is noted that the end of the core (1131) and 1132) may be sharpen in order to increase the sensitivity of the magnet polarity oscillations to vibrations or to shocks.

Figure 14:
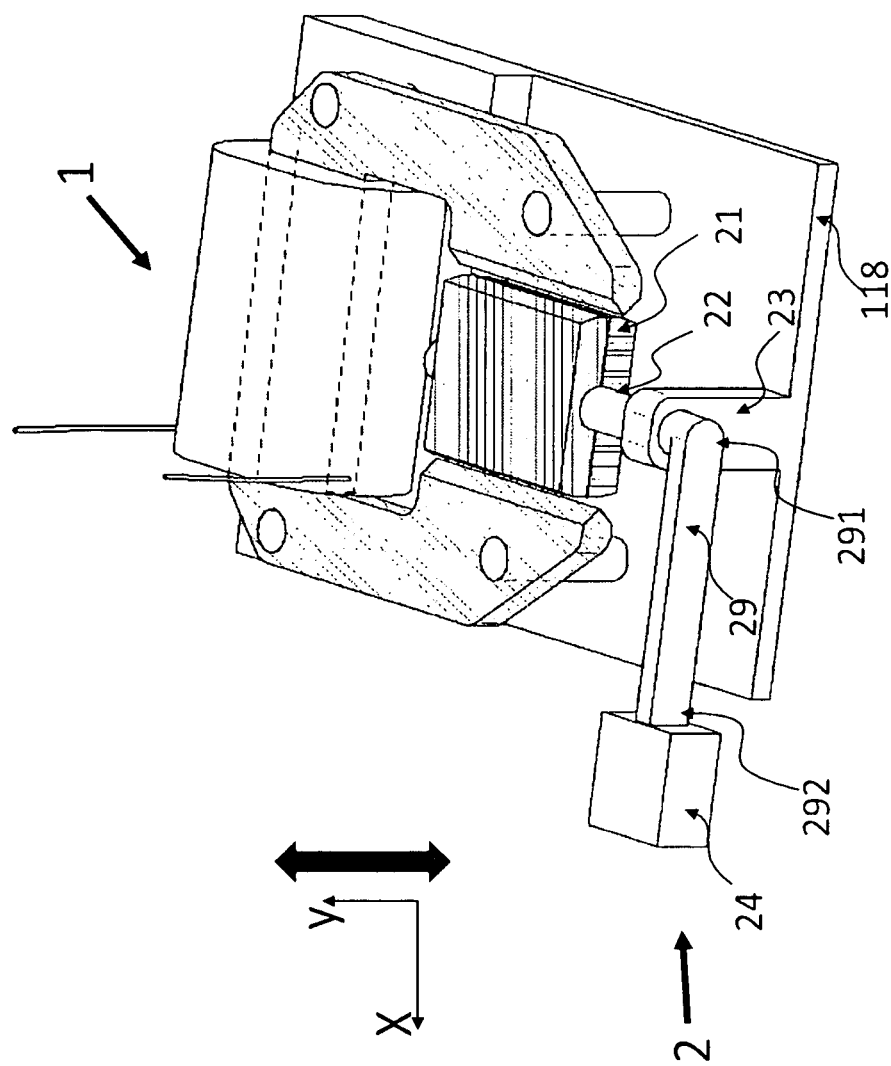
FIG. 14 is another embodiment of a spring-less electromagnetic energy harvester.

FIG. 14 describe the vibration energy harvester described in FIG. 12 such that device (2) includes a level (29) that is fixed to the hinge (22). The seismic mass (24) is relocated to the end of the lever. This design of the harvester is responsive to vibrations and shocks in the Y direction and is more sensitive due to the effect of the moment created by the seismic mass and the lever.

Figure 15:
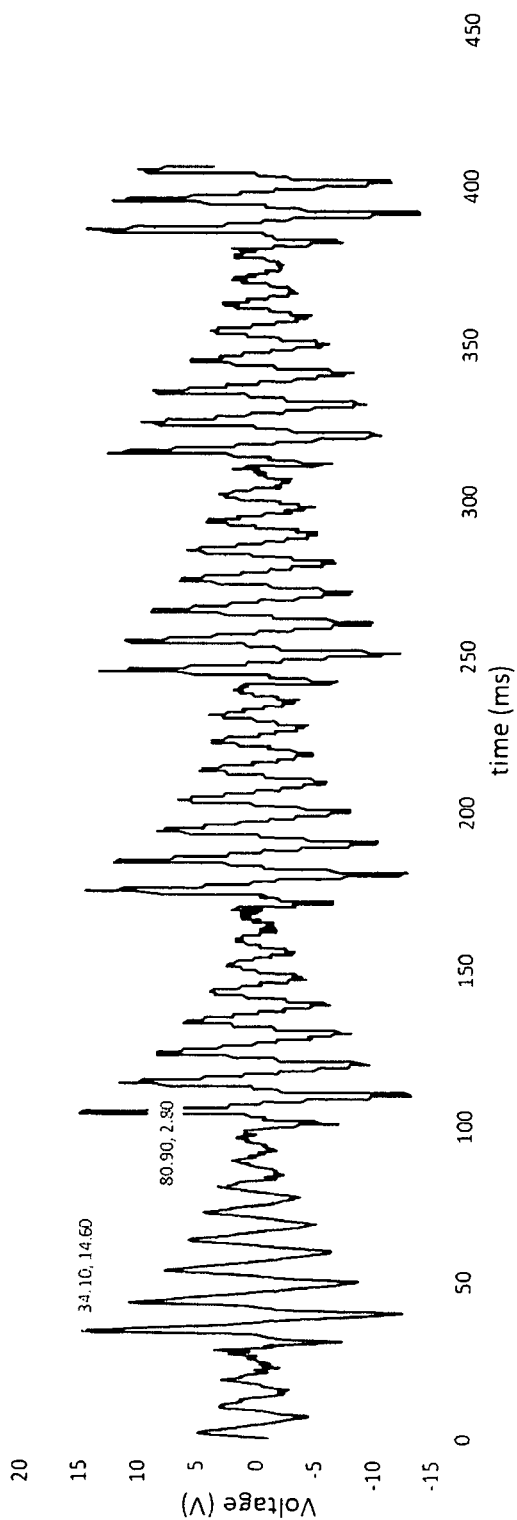
FIG. 15 is the voltage response between the ends of the coil of the spring-less electromagnetic energy harvester described in FIG. 8 when subject to impulsive forces.

FIG. 15 describes the response to impulsive forces of the harvester described in FIG. 8. The repetitive oscillation is due to repetitive impulsive forces applied on the harvester. Each impulse generates a decaying oscillation of the core relative to the magnet that generates a decaying alternating voltage between the wires of the core that reflects conversion of the kinetic energy to electricity and to friction. The oscillation depicts a spring-mass like behavior of the magnet-core-seismic mass system. The frequency of the oscillation can be calculated from the time difference between the peaks of the oscillation and in the specific case shown in FIG. 8, the resonance frequency is calculated to be 107 Hz.

In general Vibration Energy Harvesters are designed for specific vibration frequency. For a spring-mass system the resonance frequency can be calculated from $$\omega = \sqrt{\frac{k}{m}},$$

where 'ω' is the resonance frequency, 'm' is the seismic mass and 'k' is the spring constant of the spring. FIGS. 8-11 described Vibration Energy Harvester without a spring. Yet the harvesters are found to have specific resonance frequency as demonstrated in FIG. 14. This resonance frequency depends on the strength of the magnet, the weight of the magnet and the weight of the seismic mass. The resonance frequency of the Vibration Energy Harvesters described in FIGS. 8-11 can be adjusted by adjusting the strength of the magnet and by the changing the weight of the magnet and the weight of the seismic mass.

The present invention refers to an electromagnetic energy harvester for converting vibrations of a body to electricity that comprises an electromagnetic device that comprise a coil with two ends that is wound along a longitudinal axis of a ferromagnetic core, and a magnet that is suspended over a suspending device that its first end is fixed to the body and its second end is fixed to the magnet. The first end of the core is at close proximity to the magnet and the longitudinal axis of the core is aligned vertically to a magnetic axis of the magnet. Energy is harvested when vibrations of the body cause a relative alternating movement between the core and the magnet that create alternating voltage between the ends of the coil. The present invention refers also several electromagnetic devices arranged round the magnet. Such arrangement yields a higher efficiency vibration energy harvester compared to a single core harvester with same overall coil length.

In this invention the electromagnetic device may also include an upper horizontal ferromagnetic rod placed parallel above the core and the coil and a lower horizontal ferromagnetic rod placed parallel below the core and the coil such that the two roads are connected together and to the core by a lateral ferromagnetic rod. These ferromagnetic rods can confine the magnetic flux close to the coil and increase the energy harvesting efficiency.

The suspending device described in this invention may be a spring fixe at a first side to said magnet and at a second side to said body. The spring may be any type of spring for example, a compression spring, a conical spring or torsional spring.

The suspending device may also be a base that is connected to the body and a free to rotate hinge that is supported by the base connected to the magnet. In that case the harvester further includes a seismic mass that is attached to the hinge and to the magnet, such that the center of gravity of the hinge, magnet and seismic mass is shifted off from the rotation axis of the hinge. When the body is subject to vibrations or to impacts an alternating relative movement between the core and the magnet is induced. This creates an alternating voltage between said ends of said coil that can be harvested.

It is noted that the last suspending device does not include a spring. Yet it is found that the suspending device have a similar vibrational behavior that is similar to a spring-mass system. This invention teaches a method for determining a vibration resonance frequency of an electromagnetic energy harvester for converting vibrations of a body to electricity using a vibration energy harvester that comprises:
 a. a coil with two ends that is wound along a longitudinal axis of a ferromagnetic core,
 b. a magnet,
 c. a base that is designed to be connected to the body and a free to rotate hinge that is supported by the base and is connected to the magnet.
 d. a seismic mass that is attached to the hinge and to the magnet, such that the center of gravity of the hinge, magnet and seismic mass together is shifted off from the rotation axis of the hinge.
 Such that the first end of the core is close proximity to the magnet and the longitudinal axis of the core is substantially aligned vertically to a magnetic axis of the magnet. Such that choosing a specific weight for the seismic mass for determining a desirable vibration resonance frequency of the harvester.

This invention also refers to a magnet suspending device that comprises a base that is connected to the body and a free to rotate hinge that is supported by the base and is connected to said magnet. This configuration of the harvester further includes a lever with a first end that is fixed to the hinge and a second end that is fixed to a seismic mass such that vibrations of the body cause an alternating relative movement between the core and the magnet that can create alternating voltage between the ends of the coil.

This invention also teaches a method for determining a vibration resonance frequency of such spring-less electromagnetic vibration energy harvester for converting vibrations of a body to electricity that comprising:
 a. a coil with two ends that is wound along a longitudinal axis of a ferromagnetic core,
 b. a magnet,
 c. a base that is connected to the body and a free to rotate hinge that is supported by the base and connected to the magnet,
 d. a lever with a first end that is fixed to the hinge and a second end that is fixed to a seismic mass.
 Such that the first end of the core is at close proximity to the magnet and the longitudinal axis of the core is designed to be substantially aligned vertically to a magnetic axis of the magnet. The method teaches that by choosing a specific weight for the seismic mass one can determine a desirable vibration resonance frequency of the harvester.

This invention also refers to electromagnetic energy harvester that uses a suspending device that comprises:
 a. a base that is connected to said body,
 b. a free to rotate hinge) that is supported by the base,
 c. a lever connected at its first end to the free to rotate hinge and at its second end to the magnet.
 such that vibrations of the body induce relative alternating movement between the core and the magnet, that creates alternating voltage between the ends of the coil. This electromagnetic energy harvester may further include a seismic mass that is connected to said magnet or to said first end of said lever for improving the energy conversion efficiency and to set the resonance frequency of the vibration energy harvester.

This invention teaches a method for determining a vibration resonance frequency of an electromagnetic energy harvester for converting vibrations of a body to electricity that comprise:
 a. a coil with two ends that is wound along a longitudinal axis of a ferromagnetic core,
 b. a magnet,
 c. a base that is designed to be connected to the body and a free to rotate hinge that is supported by the base,
 d. a seismic mass,
 a lever with a first end that is fixed to the hinge and a second end that is fixed to the magnet and to the seismic mass.
 Such that the first end of the core is at close proximity to the magnet and wherein the longitudinal axis of the core is substantially aligned vertically to the magnetic axis of the magnet, and such that choosing a specific weight for the seismic mass can determine the desirable vibration resonance frequency of the harvester.

In this patent application the term vibration and shock are used to describe the acting forces on the Vibration and Energy Harvester. It is clear that forces of any kind are relevant.

In an up down movement of the magnet one needs to add a stop in order to prevent the spring from breaking. Still in a strong vibration or shock the magnet will hit this stop which in long term may lead to damages. Converting the up down movement to rotation prevent such damages and simplifies the device.

What is claimed is:

1. An electromagnetic energy harvester for converting vibrations of a body to electricity that comprises a coil with two ends that is wound along a longitudinal axis of a ferromagnetic core, a magnet, and a suspending device that a first end of the suspending device is designed to be fixed to the body and a second end of the suspending device is designed to be fixed to the magnet;

wherein a first end of the core is design to be at close proximity to the magnet and wherein a longitudinal axis of the core is substantially aligned vertically to a magnetic axis of the magnet;

wherein the vibrations of the body can cause a relative alternating movement between the core and the magnet that can create alternating voltage between the ends of the coil;

wherein said suspending device comprises a base that is designed to be connected to said body and a free to rotate hinge that is supported by the base and designed to be connected to said magnet;

wherein a center of gravity of the hinge together with the magnet can be shifted off a rotation axis of the hinge such that vibrations of the body can cause said alternating relative movement between the core and the magnet that can create said alternating voltage between said ends of said coil; and wherein said harvester further includes a stationary magnet that is attached to the body or to the base at close proximity to said magnet such that the positive pole of the stationary magnet faces a positive pole of the magnet so that a magnetic force of the stationary magnet can serve as a restoring force on the magnet.

2. The electromagnetic energy harvester of claim 1, wherein said stationary magnet is attached to the body or to the base at a pre-designed angle.

* * * * *